United States Patent [19]

Nagji et al.

[11] Patent Number: 4,830,733

[45] Date of Patent: May 16, 1989

[54] INTEGRATED PROCESS FOR THE REMOVAL OF SULFUR COMPOUNDS FROM FLUID STREAMS

[75] Inventors: Moez M. Nagji, Yonkers, N.J.; Ervine S. Holmes, Yorktown Heights, N.Y.

[73] Assignee: UOP

[21] Appl. No.: 104,099

[22] Filed: Oct. 5, 1987

[51] Int. Cl.$^4$ .................. C01B 17/00; B01J 1/00
[52] U.S. Cl. .................. 208/208 R; 208/299; 208/302; 208/303; 208/305; 423/230; 423/244; 585/822; 585/826; 55/73; 502/514; 502/20
[58] Field of Search .................. 423/230, 244; 208/208 R, 245, 299, 301, 302, 305, 310 R, 310 Z; 55/73; 585/822, 826; 562/20, 514

[56] References Cited

U.S. PATENT DOCUMENTS

| 3,288,705 | 11/1966 | Humphries | 208/310 R |
|---|---|---|---|
| 3,291,726 | 12/1966 | Broughton | 208/310 R |
| 3,476,822 | 11/1969 | Robertson et al. | 208/310 R |
| 4,008,174 | 2/1977 | Jacobson et al. | 423/230 |
| 4,088,736 | 5/1978 | Courty et al. | 423/230 |
| 4,374,105 | 2/1983 | Anderson et al. | 423/230 |
| 4,522,793 | 6/1985 | Larson et al. | 423/244 R |
| 4,673,557 | 6/1987 | Nieskens | 423/230 |
| 4,690,806 | 9/1987 | Schorfheide | 423/230 |

FOREIGN PATENT DOCUMENTS

| 5572 | 11/1979 | European Pat. Off. | 423/230 |
|---|---|---|---|
| 2180848 | 4/1987 | United Kingdom | 423/230 |

*Primary Examiner*—H. M. S. Sneed
*Assistant Examiner*—Helane Myers
*Attorney, Agent, or Firm*—Morris N. Reinisch

[57] ABSTRACT

The present invention relates to a new and integrated process involving the utilization of a primary adsorption bed containing a regenerable, physical adsorbent and an auxiliary sorption bed containing a chemisorbent for the removal of sulfur compounds from a fluid stream, which process provides for higher yields, higher purity and lower costs. A system for removing sulfur compounds in accordance with the above process is also disclosed.

38 Claims, 3 Drawing Sheets

INTEGRATED PROCESS FOR THE REMOVAL OF SULFUR COMPOUNDS FROM FLUID STREAMS

BACKGROUND OF THE INVENTION

1. Field of the Invention

This invention pertains to the field of purifying fluid streams by the removal of at least sulfur compounds therefrom. More particularly, the present invention relates to a new and integrated process which involves the utilization of a primary adsorption bed containing a regenerable, physical adsorbent and an auxiliary sorption bed containing a chemisorbent for the removal of sulfur compounds from the fluid stream, which process provides for higher yields and product purity while at the same time generally requires less energy consumption and/or capital costs.

2. Discussion of Related Art

The removal of sulfur compounds, particularly hydrogen sulfide and alkyl mercaptans from hydrocarbon streams is desirable for many reasons, depending in part upon the intended use of the final sweetened product. Since a very large percentage of the lighter hydrocarbons in liquid streams are ultimately used as fuel per se, the presence of sulfur compounds is objectionable because of the safety factors and corrosion problems associated with such compounds and the unpleasant odor imparted and the air pollution resulting from the combustion thereof. When used as fuels for internal-combustion engines, the sulfur compounds are deleterious to the effectiveness of known octane improvers such as tetraethyllead. The hydrocarbon streams are also generally subjected to hydrocarbon conversion processes in which the conversion catalysts are, as a rule, highly susceptible to poisoning by sulfur compounds.

So too, the tremendous increase in demand for natural gas in recent years has made the gas producers far more dependent on "sour" gas fields than ever before. As used herein, a "sour" gas is defined as a gas containing mercaptans and/or hydrogen sulfide. "Sweetening" is defined as the removal of the mercaptans and hydrogen sulfide from a gas or liquid stream. Formerly, when a gas well came in "sour", it was capped off because the supply and demand situation did not permit its purification. Recently, however, these capped wells have been put into production and are being utilized regardless of their hydrogen sulfide and mercaptan content.

Several methods for sweetening hydrocarbons streams have been proposed and utilized in the past, including both chemical and physical techniques.

The chemical processes have involved purely chemical reactions such as scrubbing with mono- or diethanolamine or countercurrent extraction using a hot potassium carbonate solution, and chemisorption methods in which iron oxide sponge or zinc oxide reacts with the sulfur compounds to form iron sulfide and zinc sulfide, respectively.

A widely used chemical system for treating natural gas streams involves scrubbing with mono- or diethanolamine. The natural gas is passed through the amine solution which absorbs the hydrogen sulfide. The solution from the absorption equipment is passed to a stripping column where heat is applied to boil the solution and release the hydrogen sulfide. The lean, stripped solution is then passed to heat exchangers, and returned to the absorption equipment to again absorb hydrogen sulfide gas. The principle disadvantages of the amine system are its high operating cost, the corrosive nature of the absorbing liquid, its inability to remove mercaptans and water from gas streams, as well as its general inability to selectively remove hydrogen sulfide from carbon dioxide.

Another prior art system is the iron sponge method of purifying natural gas, utilizing iron oxide impregnated wood chips in a packed bed. The gaseous mixture containing hydrogen sulfide and/or mercaptans contacts a packed bed of iron oxide sponge, preferably chemically absorbing the sulfur impurities on the exposed iron oxide surface. A major disadvantage of this method of sweetening natural gas is that the fusion of iron sponge particles with sulfur frequently causes a high pressure drop through the bed. Moreover, the operational cost is high because the adsorbent must be replaced frequently. Finally, the iron sulfide is pyrophoric and thus presents serious problems with the disposal of the used iron oxide.

Hydrogen sulfide has also been removed from natural gas by countercurrent extraction with a hot potassium carbonate solution. In such a system, as in the amine system discussed above, both hydrogen sulfide and carbon dioxide are removed by chemically combining with potassium carbonate and later released by stripping with steam. Generally, significant disadvantages of this method of sweetening natural gas are that an amine system must ffollow the potassium carbonate system to remove the final traces of the sulfur compounds such as hydrogen sulfide and the non-selectivity for removing the hydrogen sulfide from the carbon dioxide.

Zinc oxide has also been used for removing sulfur compounds from hydrocarbon streams. However, its high cost and substantial regeneration costs make it generally uneconomical to treat hydrocarbon streams containing an appreciable amount of sulfur compound impurities on a volume basis. So too, the use of zinc oxide and other chemisorption material similar to it disadvantageously generally require the additional energy expenditure of having to heat the sulfur containing fluid stream prior to its being contacted with the stream in order to obtain a desirable sulfur compound loading characteristic.

Selective physical adsorption of sulfur impurities on crystalline zeolitic molecular sieves is a widely used method. Both liquid phase and vapor phase processes have been developed. As used herein, a "physical adsorbent" is an adsorbent which does not chemically react with the impurities that it removes.

A typical hydrocarbon sweetening process comprises passing a sulfur-containing hydrocarbon stream through a bed of a molecular sieve adsorbent having a pore size large enough to adsorb the sulfur impurities, recovering the non-adsorbed effluent hydrocarbon until a desired degree of loading of the adsorbent with sulfur-containing impurities is obtained, and thereafter purging the adsorbent mass of hydrocarbon and regenerating the adsorbent by desorbing the sulfur-containing compounds therefrom.

The adsorbent regenerating operation is conventionally a thermal swing or combined thermal and pressure swing-type operation in which the heat input is supplied by a hot gas substantially inert toward the hydrocarbons, the molecular sieve adsorbents and the sulfur-containing adsorbate. When treating a hydrocarbon in the liquid phase, such as propane, butane or liquified petroleum gas (LPG), natural gas is ideally suited for use in purging and adsorbent regeneration, provided that it can subsequently be utilized in situ as a fuel wherein it constitutes an economic balance against its relatively high cost. Frequently, however, the sweetening operation requires more natural gas for thermal-swing regeneration than can advantageously be consumed as fuel, and therefore, constitutes an inadequacy of the regeneration gas. The result is a serious impediment to successful design and operation of sweetening processes, especially when desulfurization is carried out at a location remote from the refinery, as is frequently the case.

But even when treating a hydrocarbon in the gaseous phase with a physical adsorbent such as crystalline zeolitic molecular sieves, a purge gas must still be provided to regenerate the sulfur-compound laden adsorbent, involving the same disadvantages noted above when using a liquid phase hydrocarbon stream. Generally, a product slip-stream from an adsorbent bed in the adsorption mode is utilized as the desorption gas for regenerating a used bed. The utilization of this product gas for regeneration purposes during the entire adsorption cycle disadvantageously reduces the final product yield. Moreover, it is generally difficult to get complete sulfur-compound removal when utilizing such a physical adsorbent.

A need consequently exists to provide a process for removing sulfur-compounds from a liquid or gaseous stream which process is more economical and efficient than the prior art techniques discussed above.

SUMMARY OF THE INVENTION

Applicants have discovered a process for removing at least sulfur compounds from a fluid stream which eliminates or substantially avoids all of the disadvantages noted above.

More particularly, Applicants' process involves a totally new approach to the use of sorbents for removing sulfur compounds from a fluid stream which involves the integration of two types of sorbent beds, namely, a physical adsorbent and a chemisorbent, to arrive at a combination which is more efficient and economical than the use of either type of sorbent alone.

By virtue of this invention, the advantages of using each type of sorbent are retained while the disadvantages are substantially reduced or eliminated. This results in a process which involves less capital costs and lower operating cost while simultaneously providing a high yield of treated fluid at even greater purity.

More specifically, by studying curves plotting cycle time versus the sulfur compound concentration in the adsorption effluent and regeneration effluent, respectively, of an adsorbent bed containing regenerable, physical adsorbent, Applicants recognized that there were defined regions within the overall adsorption cycle which suggested that the conventional means of running the adsorber on the adsorption and regeneration modes might advantageously be changed. By integrating these primary physical adsorbent beds with auxiliary sorbent beds which utilize chemisorbents, Applicants have discovered that they can actually take advantage of the defined regions that they were able to recognize in the cycle plots and arrive at the present invention.

In general, the integrated process of the present invention comprises passing a fluid stream containing sulfur compound impurities through a primary adsorbent bed containing an adsorbent capable of physically adsorbing the sulfur compound impurities which adsorbent bed is in the adsorption mode, and withdrawing an adsorption effluent substantially free of sulfur compound impurities. A portion of this adsorption effluent, or some other suitable gas, is desirably heated and used as a regeneration medium to regenerate another primary adsorption bed containing sulfur compound laden adsorbent which is in the desorption mode.

The regeneration effluent leaving the adsorbent bed undergoing regeneration is allowed to leave the overall process and is utilized as fuel, flared, or the like.

This flow scheme continues until the sulfur compound concentration within the regeneration effluent progressively increases to a maximum peak value and then progressively decreases to a substantially constant value. At this point in the cycle, the regeneration effluent is now recovered by passing it to an auxiliary sorber containing chemisorbent which is selective for the sorption of sulfur compounds which may still be present in this regeneration effluent. A treated regeneration effluent is provided which is substantially free of sulfur compounds. This treated regeneration effluent may then be combined with the adsorption effluent.

This second phase of the cycle is continued until there begins to be a breakthrough of sulfur compounds in the adsorption effluent. At this time, the third phase of the cycle begins in which the adsorption effluent, now containing a predetermined concentration of sulfur compounds which is advantageously higher than that required to be in the ultimate product, is introduced into the auxiliary sorber so as to produce a product stream substantially free of sulfur compounds. At the same time, once this third phase of the cycle begins, the portion of the adsorption effluent entering the primary adsorber in the regeneration mode, or the other suitable gas used as a regeneration medium, is no longer heated so as to cool this bed in preparation for its subsequent adsorption mode. The adsorption cycle is complete when the amount of sulfur compound concentration within the adsorption effluent exceeds a predetermined value.

As a result of this integration of the primary and auxiliary sorbers containing their respective disparate sorbents, one of the primary advantages obtained is the ability to use less of the physical adsorbent in the primary adsorber than would ordinarily be required. Although at first, this reduction in the amount of adsorbent in the primary adsorber might not seem unusual inasmuch as an auxiliary sorber is also being utilized in the present invention, what is surprising and clearly advantageous is that the amount of the reduction of such adsorbent inventory is much more than would be expected.

Thus, by allowing sulfur compounds to break through in the adsorber effluent instead of trying to remove essentially all of the sulfur compounds in the primary adsorber bed, as has been true with the prior art, the amount of adsorbent reduction is advantageously much greater than the proportional amount of reduction in sulfur loading. In other words, if, for example, the sulfur load were reduced by about 20%, it would be expected that the amount of adsorbent in the adsorber would correspondingly be reduced by a similar amount. In contrast, however, a substantially greater reduction in adsorbent inventory is realized, i.e., the amount of adsorbent is generally reduced by about 20 to 70% depending upon the inlet feed conditions, with its concomitant increase in savings.

Moreover, by reducing the amount of adsorbent present in the primary adsorbers, there is less adsorbent that is required to be regenerated. As such, less purge gas is required for regeneration and less energy is required to heat the bed being regenerated to the proper desorption conditions.

Still further, the integrated process of the present invention also offers a novel method for heating the chemisorbent in the auxiliary sorbers whose sulfur compound loading capacity generally increases as its temperature is increased. Thus, in contrast to conventional techniques, the process of the present invention takes advantage of the heat that is present in the hot regeneration effluent and effectively and advantageously utilizes this heat to raise the temperature of the chemisorbent in the auxiliary sorber thereby greatly decreasing the energy requirements that would otherwise have to be supplied for such a heating step.

Of course, by realizing that the sulfur compound peak appears early in the regeneration effluent during the regeneration cycle and recovering the regeneration effluent once this peak has passed, yet an additional advantage is obtained which is in contrast to the prior art wherein none of the regeneration effluent is recovered and utilized as product stream.

Still further, by combining the sulfur removal effects of the physical adsorbent contained within the primary adsorber and the chemisorbent contained within the auxiliary sorber, and integrating these two types of sorbers in the manner discussed herein, a greater product purity is able to be obtained than is generally possible when using the physical adsorbent alone.

Finally, and perhaps most importantly, the overall integrated process generally provides a more attractive economical system when considering such factors as operating costs and initial capital installation costs for the treatment of a particular fluid stream as contrasted to the use of either of the sorbents contained within the primary or auxiliary sorbers alone for the treatment of the same fluid streams and, in general, is even more economically attractive than the use of an amine scrubbing solution particularly when the cost for subsequently removing mercaptans are also included.

The present invention provides for a unique, simple and elegant method for removing sulfur compounds from a fluid streams in a most economical and efficient manner.

BRIEF DESCRIPTION OF THE DRAWINGS

FIG. 2, which comprises FIGS. 2A, 2B, 2C, and 2C', shows a series of schematic flow sheets showing the flow of the fluid stream as it is being treated in one embodiment of the integrated process of the present invention during the various phases thereof. FIG. 2C' is an alternative embodiment of FIG. 2C.

DETAILED DESCRIPTION OF THE INVENTION

Figure 1:
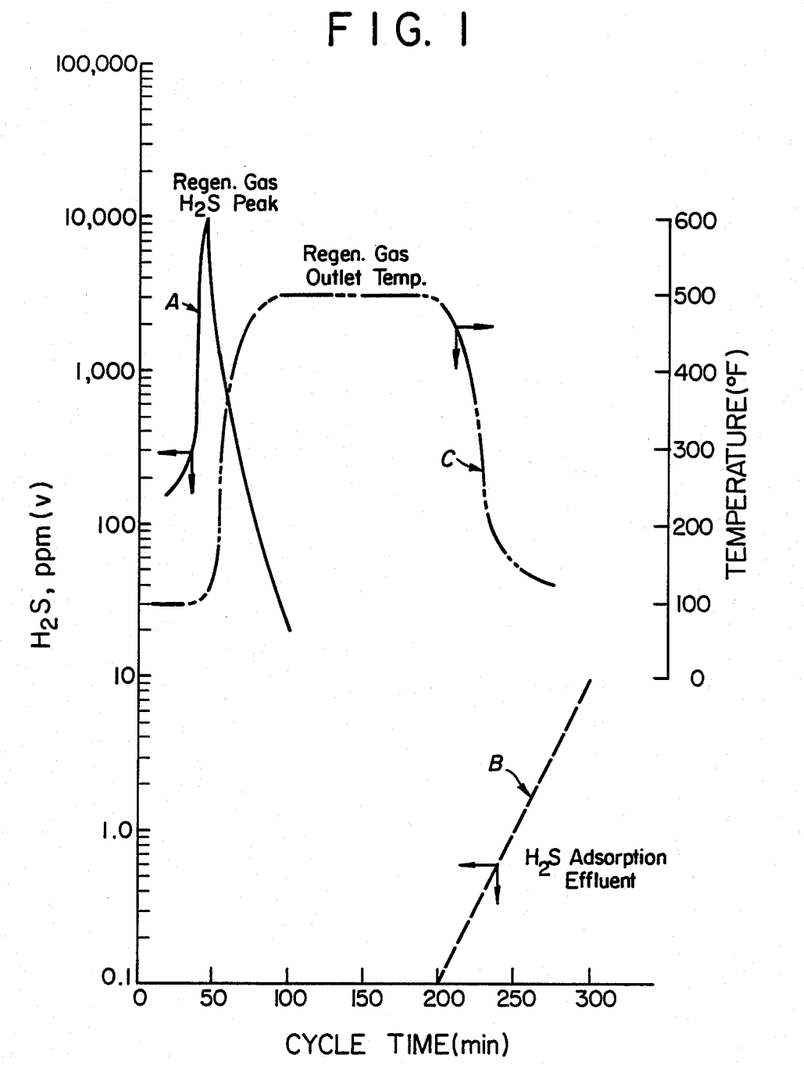
FIG. 1 is a graph which sets forth curves of hydrogen sulfide concentration in the regeneration effluent and in the adsorption effluent, respectively, as a function of cycle time, and a curve of the regeneration effluent temperature as a function of cycle time for a typical adsorption cycle in an adsorber containing a physical adsorbent.

Referring to FIG. 1, a number of curves are shown for a conventional adsorption cycle in which 140 million standard cubic feet per day (hereinafter "MMSCFD") of natural gas are treated in an adsorption bed containing zeolite molecular sieve selective for the removal of sulfur compounds, particularly hydrogen sulfide in this exemplary case. The feed is introduced to the adsorber at 100° F. and at a pressure of 1150 psig having an inlet hydrogen sulfide concentration of about 150–190 parts per million on a volume basis (hereinafter "PPMV"). As is shown, the time for a complete cycle of the adsorption process is 300 minutes.

As the natural gas flows through a newly regenerated bed from a previous cycle, an adsorption front of hydrogen sulfide is established at the inlet end of the adsorber. As adsorption continues, this front moves progressively towards the outlet end of the adsorber. As is seen from curve B, which shows the amount of hydrogen sulfide present in the adsorption effluent, it is generally not until the latter part of the cycle is reached, that hydrogen sulfide begins to break through the outlet end of the adsorber. In this case, in which a 300 minute cycle is utilized, essentially no hydrogen sulfide appears in the adsorption effluent until about 200 minutes have elapsed into the cycle. Hence, about the first two thirds of the adsorption cycle produces an adsorption effluent with substantially no hydrogen sulfide present. It is only in the final third of the cycle that hydrogen sulfide begins to appear in the adsorption effluent and continues until the final pre-determined hydrogen sulfide concentration is reached, here 10 ppmv, at which point the cycle is ended and the bed is put on a regeneration mode.

Turning to the regeneration of this now impurity-laden bed, curve A plots the amount of hydrogen sulfide appearing in the regeneration effluent as a function of cycle time. It is seen that the hydrogen sulfide concentration peaks very early in the regeneration cycle and then progressively decreases to a substantially constant level of less than about 20 ppmv for the remaining time of the cycle. Hence, essentially only the first third of the regeneration cycle contains a high concentration of hydrogen sulfide in the regeneration effluent. The remaining two thirds of the cycle contains a substantially lower level of hydrogen sulfide.

As is well known to those skilled in the art, the regeneration of a physical adsorbent such as crystalline zeolitic molecular sieve material, generally requires such regeneration to be carried out at elevated temperature. In contrast, in the adsorption mode, the maximum sulfide loading capacity is obtained at lower temperatures. Accordingly, during regeneration, as noted by curve C which sets forth the temperature of the regeneration effluent leaving the adsorber during the regeneration mode as a function of cycle time, it is seen that the bed quickly reaches its desired regeneration temperature of about 500° F. and remains at that temperature for the desired period of time at which point cooling begins for the subsequent adsorption mode. Once cooling begins, it quickly brings the temperature of the bed back to the desired temperature of about 120° F.

By virtue of the present invention, Applicants have effectively utilized these phenomena that are occurring during an adsorption cycle to produce an integrated process taking advantage of the fact that there are periods within the cycle in which the hydrogen sulfide concentration in either the regeneration effluent or adsorption effluent is substantially lower than at other times. This effective utilization of these periods of low sulfide concentration in conjunction with the appreciation and recognition that a significant decrease in the amount of adsorbent inventory of a bed containing a physical adsorbent can be realized if the load is slightly decreased, has resulted in the integrated process of the present invention wherein the cycle is essentially divided into three phases.

Reference is now made to FIG. 2, in which it is shown how the present invention divides the typical adorption cycle into three phases and integrates the physical adsorbent bed with an auxiliary chemisorbent bed to provide the integrated process of the present invention in one embodiment thereof. It is noted that the same reference numerals have been used throughout the Figures to designate the same elements.

Figure 2A:
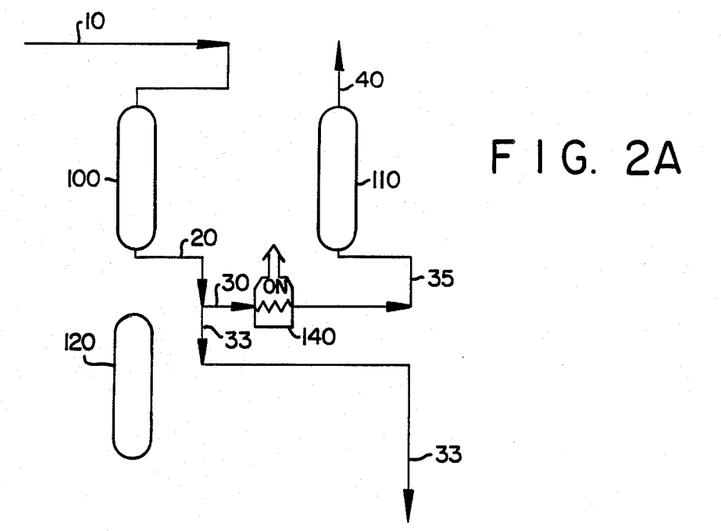

In FIG. 2A, a fluid feed stream is introduced via line 10 into primary adsorber 100 which contains a physical adsorbent selective for the adsorbent of sulfur compounds within the fluid stream. Adsorption effluent leaving in line 20 is substantially free of such sulfur compounds.

In the preferred embodiment shown in FIG. 2A, about 5 to 30%, preferably about 10 to 20% of the adsorption effluent leaving adsorber 100 is diverted from line 20 to line 30 and utilized as a regeneration medium for primary adsorber 110 which is in a regeneration mode. Adsorber 110 also contains physical adsorbent which is now laden with sulfur compounds from a previous adsorption cycle. Inasmuch as the regeneration of the adsorbent in primary adsorber 110 favors an elevated temperature, it is desirable to heat the adsorbent contained therein in any conventional manner. Preferably, as shown in FIG. 2A, the side stream of adsorption effluent in line 30 is heated in a furnace 140 prior to its being introduced via line 35 into adsorber 110. The regeneration effluent leaves through line 40 and inasmuch as the sulfur compound concentration in this first part of the cycle is very high, as noted in curve A of FIG. 1 discussed above, this portion of the regeneration effluent is allowed to leave this purification system and used either as a fuel, flared, or the like, as is conventional. The adsorption effluent in line 20, as noted above, is substantially free of sulfur compounds and provides the required product stream.

It is noted that the use of the adsorption effluent as the regeneration medium for another bed is not required in the present invention. Indeed, any externally supplied suitable material may be used as the regeneration medium in this phase of the cycle provided that it is capable of removing the sulfur impurities from the sulfur-laden bed without loading the bed with still other impurities and it is substantially inert to both the adsorbent material and the fluid feed stream material. Suitable materials which may be utilized as the regeneration medium include, but are not limited to, inert gases such as nitrogen, argon; fuel-type gases such as natural gas; hydrogen; or a residue gas of natural gas which has had its sulfur impurities and heavy hydrocarbons removed; and the like.

Figure 2B:
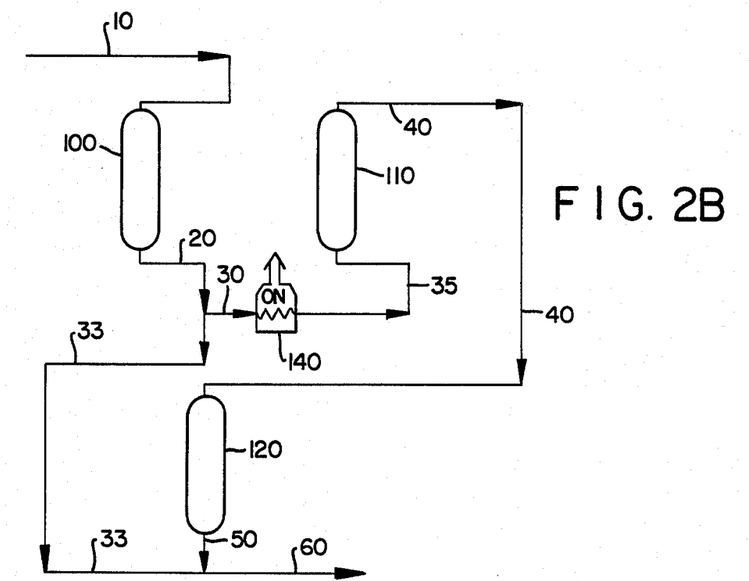

Inasmuch as one of the objectives of the present invention is to recover as much regeneration effluent as possible nd ultimately use such recovered effluent as product, the use of an externally provided regeneration medium which is not compatible with the product stream is generally limited to only the first phase of the cycle, as shown in FIG. 2A. The regeneration effluent in this first phase contains a very high amount of sulfur compounds and is removed from the system in any event, whether adsorption effluent is used as the regeneration medium or whether some other material is used, such as nitrogen. Once the regeneration effluent is no longer removed from the system and is instead recovered, as is shown in FIG. 2B, which will be discussed more fully below, the regeneration medium should then desirably be provided from a stream within the purification system itself. Of course, if, for example, natural gas were being treated for the removal of sulfur impurities, the regeneration medium could be provided from an external source throughout tee entire cycle if it were to comprise natural gas or a residue gas as defined above since such material would naturally be compatible with the final product.

Turning back to FIG. 2A, it is noted that if the cycle were to be continued in the manner shown in FIG. 2A, it would amount to a conventional adsorption/regeneration cycle in which adsorption effluent would continuously be recovered from adsorber 100 as a product stream and regeneration effluent from adsorber 110 would continuously be removed from the system throughout the entire cycle, thereby disadvantageously losing product yield. But that is where the similarity between the prior art and the present invention ends, as will be show below.

Still referring to FIG. 2A, vessel 120 is an auxiliary sorber containing chemisorbent, which as discussed above, generally has a better sulfide loading at elevated temperatures. Accordingly, since the adsorption effluent is substantially free of sulfide compounds, it is not necessary to pass this effluent through auxiliary bed 120 for further sulfur compound removal. As such, the relatively low temperature adsorption effluent advantageously does not undesirably cool the sorbent contained within auxiliary bed 120. However, it is understood that the adsorption effluent may nevertheless be passed through the auxiliary bed, if it is so desired, if the resulting temperature in the auxiliary bed is acceptable or if some other means is provided (not shown) to subsequently or simultaneously heat the bed to a higher temperature.

Thus, as an alternative embodiment of the present invention, which is not shown in FIG. 2A, the hot regeneration effluent leaving primary adsorber 110 at line 40 can be indirectly heat exchanged with the much cooler adsorption effluent contained in line 20 which heated adsorption effluent could then indeed be desirably passed through auxiliary sorber 120 in order to heat the sorbent contained therein. Moreover, if desired, an external heat source may also be provided (not shown) to the heat adsorption effluent in line 33 for subsequent passage into auxiliary sorber 120.

In yet another embodiment of the present invention, also not shown in FIG. 2A, it is also possible to heat the adsorption effluent in line 30 by indirect heat exchange with the hotter regeneration effluent leaving in line 40 prior to the adsorption effluent stream entering furnace 140 thereby decreasing the heating costs associated with operating furnace 140.

When the sulfur compound concentration within the regeneration effluent progressively increases to a maximum value and then progressively decreases to a substantially lower value, the second phase of the cycle begins as illustrated in FIG. 2B.

Essentially the only difference between the flow scheme of FIG. 2A and FIG. 2B is the passing of the regeneration effluent through auxiliary sorber 120. Thus, in contrast to the prior art, from this point on in the adsorption cycle of the present invention, the regeneration effluent leaving primary adsorber 110 is recovered by passing this regeneration effluent through the auxiliary sorber in which sulfur compounds contained within the regeneration effluent are removed. Since the major portion of the hydrogen sulfide or other sulfur impurity such as mercaptans contained within primary adsorber 110 have already been removed in the first phase of this cycle, as noted by curve A of FIG. 1, the remaining sulfur compounds present in the regeneration effluent after this sulfur compound peak has passed, can easily be accommodated on an economical and efficient manner with auxiliary bed 120 from which a treated regeneration effluent emerges in line 50 and desirably combines with the adsorption effluent in line 33 to form the product stream in line 60.

As noted earlier, the adsorption effluent, either in whole or in part, need not be the regeneration medium that is used to regenerate sulfur-laden adsorbent bed 110. While externally provided sources may be used as a regeneration medium, as discussed above, such an externally provided regeneration medium should generally not be employed once the second phase of the cycle begins in which the regeneration effluent is recovered and used as product, unless the externally provided regeneration medium is compatible and acceptably combined with the product stream.

Accordingly, in lieu of such an externally provided regeneration medium, the fluid feed stream from line 10 and/or the product stream in line 60 may be used in whole or in part with or without the adsorption effluent as a regeneration medium for regenerating primary adsorber 110. Any of these streams are perfectly suitable for such regeneration.

Moreover, as in FIG. 2A discussed above, while the adsorption effluent in line 33 is shown in FIG. 2B as by passing auxiliary sorber 120 since the adsorption effluent is still substantially free of sulfide compounds, if desired, it may be passed through auxiliary sorber 120.

This second phase of the adsorption cycle continues until the adsorption front contained within primary adsorber 100 progressively moves toward the outlet end thereof and finally breaks through at which time an increase in sulfur compound concentration appears in the adsorption effluent. The third and final phase of the cycle is then implemented which is shown in the embodiment of FIG. 2C.

Figure 2C:
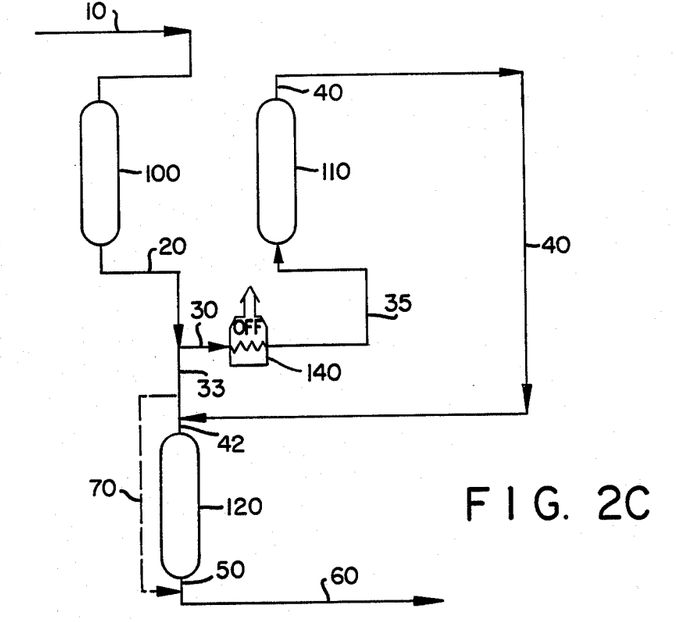

The flow scheme in FIG. 2C is different from that shown in FIG. 2B in essentially two respects. Firstly, the adsorption effluent, now containing sulfur compounds in an amount greater than that required in the product, is passed through auxiliary sorber 120 via lines 33 and 42 to remove these sulfur compounds. So too, in the embodiment shown in FIG. 2C in which the adsorption effluent is used as the regeneration medium, heating of the portion of the adsorption effluent entering adsorber 110 for regeneration purposes is also discontinued by shutting off furnace 140. In this manner, the temperature of the adsorbent contained within adsorber 110 is advantageously cooled in advance of its being put onto an adsorption mode. Of course, such cooling of adsorber 110 would be required regardless of the source of the regeneration medium and any heating of such a regeneration medium other than adsorption effluent would similarly cease in this third phase of the cycle.

In this third phase of the cycle, regeneration effluent still continues to be recovered and treated by being introduced into an auxiliary sorber. In the embodiment shown in FIG. 2C, the same auxiliary sorber is used to treat both the adsorption effluent and the regeneration effluent. However, a plurality of such sorbers may be employed either in series or in parallel including extra sorbers to allow for replacement of used sorbent. Similarly, although only one primary adsorber is depicted in FIG. 2 as being on the adsorption mode and one on the regeneration mode, respectively, it is well known to those skilled in the art that a plurality of such adsorbers may be employed in a manner which is conventional in the art.

A product stream being substantially free of sulfur compounds comprising the treated adsorption effluent and the treated regeneration effluent is then obtained.

In the embodiment shown in FIG. 2C, by combining the regeneration effluent with the substantially colder adsorption effluent in line 42, the temperature of the combined stream entering auxiliary sorber 120 may be low enough such that it undesirably cools the sorbent in auxiliary sorber 120. Accordingly, if desired, it may be advantageous to utilize an indirect heat exchanger (not shown) as a further embodiment of this invention in order to heat the combined stream prior to its entering auxiliary sorber 120.

The third phase of the cycle is complete and adsorption ends when the sulfur compound concentration in the adsorption effluent reaches a pre-determined value, such a 10 ppmv shown in FIG. 1.

As yet a further embodiment of the present invention, because the product stream leaving the auxiliary sorber 120 is substantially devoid of sulfide compounds and since product specifications usually allow for some sulfur compounds to be present in the product streams, say 5 ppmv, it is possible, if desired, to by pass a portion of the adsorption effluent in line 33 around the auxiliary sorber 120 via dotted line 70 and combine this effluent with the product in line 60. The combination of the effluent having a sulfide concentration of say 10 ppmv with the product stream having 0 ppmv of sulfide would result in the required product specification of 5 ppmv. Of course, depending upon the actual amount of sulfur compounds contained within the adsorption effluent and the actual required product specification, one skilled in the art can readily vary the proportions of the effluent and product streams in order to arrive at a particular final average which should equal the product specification for the amount of sulfur compounds allowed. The advantage of by passing some adsorption effluent past the auxiliary sorber is to reduce the sulfur loading on this bed and consequently increase its operating life.

Referring now to FIG. 2C′, a further alternative embodiment for the third phase of the cycle is shown. Here, the feedstock enters through line 10′ and is split into lines 12′ and 14′ to enter primary adsorbers 100 and 110, respectively. In this embodiment, a portion of the feedstock is introduced to adsorber 110 at the inlet thereof instead of introducing regeneration medium at the outlet end as in the embodiment shown in FIG. 2C. In this manner, although the adsorbent contained within adsorber 110 has not yet been cooled to be strictly speaking on the adsorption mode, it nevertheless is employed on a somewhat semi-adsorption mode in which cooling is provided by the entering feedstock which progressively allows for additional adsorption capability as cooling continues by the introduction of the relatively cooler feedstock into adsorber 110. Moreover, since only a portion of the feedstock is entering adsorbers 100 and 110, respectively, the amount of sulfide load per bed is considerably lower. This is one of the advantages of this alternative embodiment, i.e., the adsorption effluents leaving adsorbers 100 and 110 at lines 16′ and 18′, respectively, have considerably lesser amount of sulfur compound concentration than the adsorption effluent of the embodiment shown in FIG. 2C. In this manner, less loading is also required in auxiliary sorber 120.

The adsorption effluents leaving adsorbers 100 and 110 can then individually and separately be treated by one or more auxiliary sorbers or, as shown in FIG. 2C', can be combined and passed via line 20' to auxiliary sorber 120 and be recovered as a product stream containing a purified fluid stream in line 22'.

The fluid stream that is suitably treated in the process of the present invention is not critical with respect to its origin, its constituent molecular species or its relative proportions of those molecular species within the feedstock. Thus, the fluid stream may be a hydrocarbon stream resulting from the destructive hydrogenation of coal or it may be obtained from deposits of natural gas or petroleum. Sulfur-containing condensates from natural gas, i.e., the LPG compositions rich in propane and butanes, are also well suited to the present process as are natural gasolines and relatively light petroleum fractions boiling between about $-44°$ to about $180°$ F. which are mostly comprised of $C_3$ to $C_6$ hydrocarbons. Moreover, liquid or liquifiable olefin or olefin containing streams, such as those used in alkylation processes, containing propylene butylene, amylene, and the like, are also suitably employed. The preferred feedstock for treatment in accordance with the present, invention is, however, a sour natural gas.

Generally, the sulfur compound impurities present in these feed streams comprises at least one but ordinarily a mixture of two or more of hydrogen sulfide, the mercaptans such as ethyl mercaptan, n-propyl mercaptan, isopropyl mercaptan, n-butyl mercaptan, isobutyl mercaptan, t-butyl mercaptan, and the isomeric forms of amyl and hexyl mercaptan, the heterocyclic sulfur compounds such as thiophene and 1,2-dithiol, and aromatic mercaptans exemplified by phenyl mercaptan, organic sulfides generally and carbonyl sulfide, and the like.

The physical adsorbent employed in the primary adsorbers of the present invention are adsorbents which are regenerable and which are applicable for selectively adsorbing the above noted sulfur compound impurities from a fluid stream by means of a physical adsorption process in contrast to a chemical reaction. Suitable physical adsorbents include, but are not limited to, crystalline zeolite molecular sieves, carbon-based adsorbents, silica gel, activated alumina, and the like.

The physical adsorbents which are particularly suitable in the process of this invention are the crystalline zeolite molecular sieves.

The term "zeolite", in general, refers to a group of naturally occurring and synthetic hydrated metal alumino silicates, many of which are crystal in structure. There are, however, significant differences between the various synthetic and natural materials in chemical composition, crystal structure and physical properties such as x-ray powder diffraction patterns.

The structure of the crystalline zeolite molecular sieves may be described as an open three-dimensional frame work of $SiO_4$ and $AlO_4$ tetrahedra. These zeolites are activated by driving off substantially all of the water of hydration. The space remaining in the crystals after activation is available for adsorption of absorbate molecules. This space is then available for adsorption of molecules having a size, shape and energy which permits entry of the adsorbate molecules to the pores of the molecular sieves.

Molecular sieves having pores with an apparent minimum dimension of at least 3.8 angstrom units have been found satisfactory when the sulfur compound impurity which is to be adsorbed is hydrogen sulfide. For normal mercaptans having less than seven carbon atoms, the apparent pore size should be at least about 4.6 angstrom units. The sulfur compounds of larger molecular dimensions such as isopropyl mercaptan, isobutyl mercaptan, t-butyl mercaptan, the isomeric form of amyl and hexyl mercaptan, and the heterocyclic sulfur compounds exemplified by thiophene as well as the aromatic mercaptans exemplified by phenyl mercaptan require the use of a zeolitic molecular sieve having apparent pore openings of at least about 6 angstrom units.

The term "apparent pore size" as used herein may be defined as the maximum critical dimension of the molecular species which is adsorbed by the zeolitic molecular sieve in question under normal conditions. The apparent pore size will always be larger than the effective pore diameter, which may be defined as the free diameter of the appropriate silicate ring in the zeolite structure.

Among the naturally occurring zeolitic molecular sieves suitable for use in the present invention include mordenite and chabazite, both having an apparent pore size of about 4 angstrom units, erionite having an apparent pore size of about 5 angstrom units, and faujasite having a pore size of about 10 angstroms.

The preferred synthetic crystalline zeolitic molecular sieves includes zeolites A, X, Y and L, each of which have a pore size of about 3 to 10 angstroms and which are all well known to those skilled in the art. Reference is made to U.S. Pat. No. 3,620,969 which discusses these zeolites. Most preferred are zeolites 4A, 5A, and zeolite 13X, alone or in combination with each other.

The pore size of the zeolitic molecular sieves may be varied by employing different metal cations. For example, sodium zeolite A (U.S. Pat. No. 2,882,243) has an apparent pore size of about 4 angstrom units, whereas calcium zeolite A has an apparent pore size of about 5 angstrom units.

The zeolites occur as agglomerates of fine crystals or are synthesized as fine powders and are preferably tableted or pelletized for large scale adsorption uses. Pelletizing methods are known which are very satisfactory because the sorptive character of the zeolite, both with regard to selectivity and capacity, remains essentially unchanged. Many suitable inert binder materials or compositions are well known in the art including clays, refractory metal oxides and alkali metal silicates, if it is desired to utilize the adsorbents in agglomerated form. In general, the individual molecular sieve crystals are quite small (of the order of 10 microns) and hence in fixed bed operation, at least, it is advantageous to agglomerate the crystals int beads, pellets, extrudate forms, etc., either with or without added binder material.

Generally, the conditions for adsorption utilizing the molecular sieves include a temperature in the range from about $32°$ to about $200°$ F., and more preferably a temperature in the range from about $50°$ to about $140°$ F. at a pressure of 0.1 to 4000 psig and more preferably 10 to 2000 psig. For desorption, it is desirable to maintain the adsorbent undergoing regeneration at a temperature of from about $300°$ to about $700°$ F., more preferably about $450°$ to about $600°$ F., at the same pressure range noted for adsorption.

Activated alumina is a porous form of aluminum oxide of high surface area. It is capable of selective physical adsorption in many applications and is chemically inert to most gases and vapors, non toxic and will not soften, swell or disintegrate when immersed in water. High resistance to shock and abrasion are two of its important physical characteristics. The adsorbed material may be driven from the activated alumina by suitable choice of reactivating temperature, thus returning it to its original adsorptive form.

Activated aluminum may be reactivated to its original adsorptive efficiency by employing a heating medium at any temperature between 250° F. and 600° F. For thorough regeneration, the temperature of the regenerating gas on the exit side of the bed should reach at least 350° F.

Silica gel is a granular, amorphous form of silica, made from sodium silicate and sulfuric acid. Silica gel has an almost infinite number of sub microscopic pores or capillaries by which it can act as a selective adsorbent depending upon the polarity and molecular size of the constituents within the fluid feed stream that is being treated.

The use of these physical adsorbents as well as adsorbents such as activated carbon, and the like, are well known to those skilled in the art and their selection, operating conditions and regenerating conditions are easily ascertainable to those skilled in the art.

The sorbents that are suitable for use in the auxiliary sorbers of the present invention are preferably chemisorbents which chemically react with the sulfur compounds rather than merely physically adsorbing them as do the physical adsorbents discussed above. Generally, these materials are not readily regenerable and must be discarded and replenished when they are laden with the sulfur compound materials. Obviously, these chemisorbents must be able to also selectively remove sulfur compound impurities from the fluid streams such as those described above.

Suitable chemisorbents that are applicable in the present invention include, but are certainly not limited to, zinc oxide; iron sponge; causticized alumina; impregnated carbon, such as carbon impregnated with iodine or metallic cations; as well as zeolite A, zeolite X or zeolite Y, all of which have been ion exchanged with either zinc, copper or iron cations; chelating compounds such as metal complexes and the like; and suitable liquid treating solutions capable of selectively removing sulfur compound impurities such as Merox (distributed by UOP, Des Plaines, Ill.); and the like.

Preferably, zinc oxide is utilized as the sorbent in the auxiliary sorber.

The determination of the size of the primary and auxiliary beds that are employed for a given fluid feedstock at a particular set of conditions involves a balancing of capital costs, operating costs, regeneration requirements and recovery, gains in sorbent inventory reduction, and the like, in order to arrive at an overall cost for a particular system and a further determination as to whether the optimized combination has been obtained.

Generally, as noted above, even a slight decrease in the loading requirements of the primary adsorber will result in a large reduction in adsorbent inventory. This is vividly demonstrated below in Table I in which the % reduction in the amount of molecular sieve required to remove hydrogen sulfide from a feed stream of natural gas at a variety of different starting hydrogen sulfide concentrations and at different inlet pressures is set forth when going from the case in which the molecular sieve adsorbent is expected to reduce the sulfide concentration to 1 ppmv, as may be required by the prior art, to the embodiment of the present invention in which the sulfide is allowed to break through the primary adsorber to the extent of 5 ppmv, which will ultimately be removed by an auxiliary sorber containing 300 cubic feet of zinc oxide.

TABLE I

MOLECULAR SIEVE BED SIZE COMPARISONS

|  | $H_2S$ in. Feed (ppmv) | Feed Pressure (psig) | % Reduction in Amount of MS Needed at 5 ppmv |
|---|---|---|---|
| (1) | 20 | 1000 | 27 |
| (2) | 50 | 1000 | 14 |
| (3) | 100 | 1000 | 9 |
| (4) | 1000 | 1000 | 2 |
| (5) | 10 | 500 | 73 |
| (6) | 20 | 500 | 40 |
| (7) | 50 | 500 | 11 |
| (8) | 100 | 500 | 9 |
| (9) | 1000 | 500 | 4 |

As is clearly seen, depending upon the inlet conditions of the feed stream, it is not uncommon to be able to realize reductions in the molecular sieve inventory of as much as 50 to 75 percent.

Once a particular breakthrough is arbitrarily chosen, the amount of sorbent required in the auxiliary bed to provide a given operating life before replacement is necessary is determined based on design considerations well known to those skilled in the art. Similarly, based upon design considerations well known to those skilled in the art, once the inlet and outlet conditions for the primary adsorber are also known, it is a simple matter to determine the amount of adsorbent needed to provide the chosen sulfide concentration breakthrough in the adsorption effluent. This initial determination, however, may not be the most optimized design although the amount of physical adsorbent may have nevertheless been reduced. The optimum fine tuning of this design will depend upon the overall costs involved for a particular system including the initial capital costs and continuing operating costs for a given period of time. This is clearly demonstrated in Table II below.

TABLE II

OVERALL COSTS OF DIFFERENT SULFIDE REMOVAL SYSTEMS

FEED: Natural Gas 900 MMSCFD $H_2S$ = 25 ppmv $CO_2$ = 1.0%

|  | MS | MS + ZnO | Optimized MS + ZnO | ZnO | DEA[1] 50% SOLN |
|---|---|---|---|---|---|
| INITIAL CHARGE |  |  |  |  |  |
| MS, M$ (BEDS) | 918(12) | 680(12) | 360(8) | — | — |
| ZnO, M$ (BEDS) | — | 780(6) | 520(4) | 7611 | — |

TABLE II-continued
OVERALL COSTS OF DIFFERENT SULFIDE REMOVAL SYSTEMS

FEED: Natural Gas
900 MMSCFD
$H_2S$ = 25 ppmv
$CO_2$ = 1.0%

|  | MS | MS + ZnO | Optimized MS + ZnO | ZnO | DEA[1] 50% SOLN |
|---|---|---|---|---|---|
| REGEN. GAS REQ'D |  |  |  |  |  |
| MMSCFD | 126 | 45 | 25 | — | — |
| UTILITY COSTS |  |  |  |  |  |
| MS M$/YR | 459 | 340 | 180 | 0 | 0 |
| ZnO M$/YR | 0 | 780 | 520 | 7611 | 0 |
| REGEN. BTU, M$/YR | 1080 | 798 | 400 | 0 | 0 |
| ZnO FEED PREHEAT, M$/YR | 0 | 0 | 0 | 3234 | 0 |
| REGEN. DEA, M$/YR | 500 | 250 | 0 | 0 | 2618 |
| TOTAL M$/YR | 2039 | 2168 | 1100 | 10845 | 2618 |
| SAVINGS, M$/YR | 939 | 1068 | — | 9745 | 1518 |
| CAPITAL COSTS |  |  |  |  |  |
| MS, MM $ | 11.4 | 9.6 | 5.6 | — | — |
| ZnO, MM $ | — | 3.3 | 3.5 | 5.0 | — |
| REGEN. DEA, MM $ | 2.0 | 1.4 | — | — | — |
| DEA, MM $ | — | — | — | — | 8.2 |
| TOTAL MM $ | 13.4 | 14.3 | 9.1 | 5.0 | 8.2 |

[1] DEA = diethanolamine
Assumptions made:
1. $H_2S$ loading in ZnO in equal to 12 lbs $H_2S/ft^3$ ZnO.
2. 1 $ft^3$ ZnO = $175.00; ZnO life = 6 months
3. MS life = 2 yrs
4. $3/MM BTU for MS regen. treatment.
5. MS cost = $1.75/lb.

As is clearly seen, although the "MS+ZnO" example is quite advantageous over the MS, ZnO or DEA systems alone, an optimized combination of MS and ZnO could still be designed which provides even more dramatic results.

The optimized molecular sieve/zinc oxide system provides a substantial savings in utility costs and in initial capital costs as well as a dramatic decrease in the amount of regeneration gas that is typically lost in prior art techniques. While the individual zinc oxide system requires a lower initial investment cost, the much higher yearly operating costs more than make up for this initial difference in installation cost.

What is claimed is:

1. A process for the removal of sulfur compounds from a fluid stream feedstock comprising the steps of:
   (a) passing the fluid stream through an inlet end of at least one primary adsorber which is on an adsorption mode containing adsorbent selective for the adsorption of sulfur compounds and removing and adsorption effluent which is substantially free of sulfur compounds from the outlet end of the at least one primary adsorber, wherein as adsorption continues an adsorption front of the sulfur compounds is established at the inlet end of the adsorber and progressively moves towards the outlet end;
   (b) passing a portion of the adsorption effluent, as a regeneration medium, through the outlet end of at least one primary adsorber which is on a regeneration mode and contains sulfur-laden adsorbent under desorption conditions to regenerate the adsorbent and provide a regeneration effluent leaving the inlet end of the adsorber containing an increased concentration of the sulfur compounds, wherein as regeneration continues, the sulfur compound concentration within the regeneration effluent progressively increases to a maximum value and then progressively decrease to a substantially lower value;
   (c) passing the regeneration effluent, when the sulfur compound concentration has decreased to a substantially lower level, to at least one auxiliary sorber containing sorbent selective for the sorption of sulfur compounds in the regeneration effluent to provide a treated regeneration effluent being substantially free of sulfur compounds;
   (d) passing the adsorption effluent from step (a) through at least one auxiliary sorber containing sorbent selective for the sorption of sulfur compounds in the regeneration effluent when the adsorption front breaks through the outlet end of the adsorber to cause an increase in the concentration of sulfur compounds in the adsorption effluent, to provide a treated adsorption effluent being substantially free of sulfur compounds, and continuing the adsorption in step (a) until the adsorption effluent reaches a predetermined sulfur compound concentration value.

2. The process of claim 1, wherein another portion of the adsorption effluent is passed through the at least one auxiliary sorber prior to the adsorption front breaking through the outlet end of the adsorber.

3. The process of claim 2, wherein the adsorption effluent is heated prior to being passed through the at least one auxiliary sorber by indirect heat exchange with regeneration effluent.

4. The process of claim 1, wherein from about 5% to about 30% of the adsorption effluent is used as the regeneration medium.

5. The process of claim 1, wherein the regeneration medium additionally comprises the treated adsorption effluent from step (d).

6. The process of claim 1, wherein the regeneration medium additionally comprises the fluid stream feedstock.

7. The process of claim 1, wherein the regeneration medium additionally comprises the treated regeneration effluent from step (c).

8. The process of claim 1, wherein the regeneration medium additionally comprises a gas is selected from the group consisting of hydrogen, nitrogen, natural gas, a residue of natural gas, argon, and combinations thereof.

9. The process of claim 1, wherein the desorption conditions for the regeneration of the primary adsorber comprises an initial heating phase and a subsequent cooling phase.

10. The process of claim 9, wherein the adsorber undergoing regeneration is cooled to a temperature in the range of from about 32° to about 200° F.

11. The process of claim 10, wherein the adsorber undergoing regeneration is cooled to a temperature within the range of from about 50° to about 140° F.

12. The process of claim 9, wherein the adsorber undergoing regeneration is heated by heating the regeneration medium prior to its entering the outlet end of the adsorber.

13. The process of claim 12, wherein the regeneration medium is heated by indirect heat exchange with the regeneration effluent.

14. The process of claim 9 wherein the adsorber undergoing regeneration is heated to a temperature in the range of from about 300° to about 700° F.

15. The process of claim 14, wherein the adsorber undergoing regeneration is heated to a temperature in the range of from about 450° to about 600° F.

16. The process of claim 12, wherein the adsorber undergoing regeneration is cooled by discontinuing the heating of the regeneration medium entering the outlet end of the adsorber.

17. The process of claim 3, wherein the at least one adsorber undergoing regeneration is cooled by discontinuing the passing of the portion of the adsorption effluent entering the outlet end of the at least one adsorber undergoing regeneration when the adsorption front in the at least one adsorber undergoing adsorption breaks through and passing fluid stream feedstock through the inlet end of the adsorber undergoing regeneration to provide a discharge stream having a reduced concentration of sulfur compounds and then passing this discharge stream to at least one auxiliary sorber containing sorbent selective for the sorption of sulfur compounds in the discharge stream to provide a treated discharge stream which is substantially free of sulfur compounds.

18. The process of claim 17, wherein the fluid stream feedstock is a portion of the fluid stream feedstock entering the at least one adsorber undergoing adsorption.

19. The process of claim 17, wherein the discharge stream is combined with the adsorption effluent from step (d) of claim 1, prior to being introduced into the auxiliary sorber.

20. The process of claim 1, wherein the regeneration effluent of step (c) and the adsorption effluent of step (d) are combined prior to being introduced into the auxiliary sorber.

21. The process of claim 1, wherein the adsorbent in the primary adsorber is selected from the group consisting of crystalline zeolitic molecular sieves, carbon based adsorbents, silica gel, activated alumina, and combinations thereof.

22. The process of claim 21, wherein the crystalline zeolitic molecular sieve material has an apparent pore size of at least 3.8 angstrom units.

23. The process of claim 21, wherein the crystalline zeolitic molecular sieve material is selected from the group consisting of zeolite 5A, zeolite 13X, zeolite 4A, and combinations thereof.

24. The process of claim 1, wherein the sorbent in the auxiliary sorber is a chemisorbent which chemically reacts with the sulfur compounds.

25. The process of claim 24, wherein the sorbent in the auxiliary sorber is selected from the group consisting of zinc oxide, iron sponge, causticized alumina, impregnated carbons, chelating compounds, and combinations thereof.

26. The process of claim 24, wherein the chemisorbent has higher sulfur compound loading at elevated temperatures.

27. The process of claim 24, wherein the chemisorbent contained within the auxiliary adsorber is heated to provide higher sulfur compound loading.

28. The process of claim 26, wherein the chemisorbent contained within the auxiliary sorber is heated to provide higher sulfur compound loading by passing regeneration effluent which is at elevated temperature through the auxiliary bed.

29. The process of claim 26, wherein the chemisorbent contained within the auxiliary sorber is heated to provide higher sulfur compound loading by passing adsorption effluent through the auxiliary sorber which has been heated by indirect heat exchange with regeneration effluent leaving the adsorber undergoing regeneration at elevated temperature.

30. The process of claim 1, wherein the fluid stream feedstock is in the gaseous or liquid state.

31. The process of claim 1, wherein the fluid stream feedstock comprises natural gas.

32. The process of claim 1, wherein the sulfur compound impurities comprise hydrogen sulfide, alkyl mercaptans, or combinations thereof.

33. The process of claim 1, wherein the adsorbent in the primary adsorber is a crystalline zeolitic molecular sieve and the sorbent in the auxiliary sorber is zinc oxide.

34. The process of claim 1, wherein the adsorbent in the primary adsorber is zeolite 4A, 5A, 13X or a combination thereof and the sorbent in the auxiliary sorber is zinc oxide.

35. A process for the removal of sulfur compounds from a hydrocarbon fluid stream comprising the steps of:

(a) passing the hydrocarbon fluid stream through the inlet end of at least one primary adsorber which is on an adsorption mode containing crystalline zeolitic molecular sieve adsorbent selective for the adsorption of sulfur compounds and removing an adsorption effluent which is substantially free of sulfur compounds from the outlet end of the at least one primary adsorber, wherein as adsorption continues an adsorption front of the sulfur compounds is established at the inlet end of the adsorber and moves progressively towards the outlet end;

(b) heating a portion of the adsorption effluent and passing this heated portion through the outlet end of at least one primary adsorber which is on a regeneration mode and contains sulfur-laden adsorbent under desorption conditions to regenerate the adsorbent and provide a regeneration effluent at elevated temperature leaving the inlet end of the adsorber containing an increased concentration of the sulfur compounds, wherein as regeneration continues, the sulfur compound concentration within the regeneration effluent progressively increases to a maximum value and then progressively decreases to a substantially lower value;

(c) passing the heated regeneration effluent, when the sulfur compound concentration has decreased to a substantially constant level, to at least one auxiliary sorber containing a chemisorbent which is selective for the sorption of sulfur compounds in the regeneration effluent and which chemisorbent has higher sulfur compound loading at higher temperatures, to provide a treated regeneration effluent being substantially free of sulfur compounds, and to simultaneously heat the chemisorbent contained within the auxiliary sorber so as to increase its sulfur compound loading capacity;

(d) when the adsorption front breaks through the outlet end of the adsorber to cause an increase in the concentration of sulfur compounds in the adsorption effluent, (i) passing the adsorption effluent from step (a) through at least one heated auxiliary sorber containing sorbent selective for the adsorption of sulfur compounds in the adsorption effluent to provide a treated adsorption effluent being substantially free of sulfur compounds, and continuing the adsorption in step (a) until the adsorption effluent reaches a predetermined sulfur compound concentration value; and (ii) discontinuing the heating of the portion of the effluent entering the outlet end of the adsorber.

36. The process of claim 35 further comprising the steps of combining the regeneration effluent of step (c) and the adsorption effluent of step (d) and passing the combination through the heated auxiliary sorber.

37. The process of claim 35, wherein the crystalline zeolitic molecular sieve is zeolite 4A, 5A, 13X or a combination thereof and the chemisorbent in the auxiliary sorber is zinc oxide.

38. The process of claim 35, wherein the at least one adsorber undergoing regeneration is cooled by discontinuing the passing of the portion of the adsorption effluent entering the outlet end of the at least one adsorber undergoing regeneration when the adsorption front in the at least one adsorber undergoing adsorption breaks through; and passing hydrocarbon fluid stream through the inlet end of the adsorber undergoing regeneration to provide a discharge stream having a reduced concentration of sulfur compounds; and then passing this discharge stream to the auxiliary sorber to provide a treated discharge stream which is substantially free of sulfur compounds.

* * * * *

UNITED STATES PATENT AND TRADEMARK OFFICE
CERTIFICATE OF CORRECTION

PATENT NO. : 4,830,733
DATED : May 16, 1989
INVENTOR(S) : Nagji et al.

It is certified that error appears in the above-identified patent and that said Letters Patent is hereby corrected as shown below:

In Column 15, line 49: Change "and" (second occurrence) to --an--.

Signed and Sealed this

Thirtieth Day of April, 1991

Attest:

HARRY F. MANBECK, JR.

Attesting Officer

Commissioner of Patents and Trademarks